(12) United States Patent
Bouterse et al.

(10) Patent No.: US 10,411,896 B2
(45) Date of Patent: Sep. 10, 2019

(54) MIXED CHECKSUM INJECTION FOR CONTENT VERIFICATION ON MULTIPLE PLATFORMS

(71) Applicant: Red Hat, Inc., Raleigh, NC (US)

(72) Inventors: Brian Michael Bouterse, Raleigh, NC (US); Michael John Hrivnak, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 203 days.

(21) Appl. No.: 15/430,892

(22) Filed: Feb. 13, 2017

(65) Prior Publication Data

US 2018/0234247 A1 Aug. 16, 2018

(51) Int. Cl.
 *H04L 9/32* (2006.01)
 *G06F 21/64* (2013.01)

(52) U.S. Cl.
 CPC ............ *H04L 9/3239* (2013.01); *G06F 21/64* (2013.01)

(58) Field of Classification Search
 CPC .......... G06F 21/64; H04L 9/06; H04L 9/0643
 USPC ................................................. 713/150–155
 See application file for complete search history.

(56) References Cited

U.S. PATENT DOCUMENTS

| | | | |
|---|---|---|---|
| 8,165,998 B2 | 4/2012 | Semerdzhiev | |
| 8,510,571 B1 | 8/2013 | Chang et al. | |
| 8,649,509 B2 | 2/2014 | Asher | |
| 8,713,558 B2 | 4/2014 | Vidal et al. | |
| 8,793,506 B2 * | 7/2014 | Kasatkin | G06F 21/64 713/189 |
| 8,856,771 B2 * | 10/2014 | Chalmers | G06F 21/572 717/168 |
| 9,009,696 B2 | 4/2015 | Vidal et al. | |
| 9,177,153 B1 * | 11/2015 | Perrig | G06F 21/57 |
| 9,177,293 B1 * | 11/2015 | Gagnon | G06Q 10/107 |
| 2006/0116966 A1 | 6/2006 | Pedersen et al. | |
| 2011/0265083 A1 * | 10/2011 | Davis | G06F 12/0866 718/1 |

(Continued)

OTHER PUBLICATIONS

Gulley et al., Multi-Hash a Family of Cryptographic Hash Algorithm Extensions, IA Architects, Intel Corporation, Jul. 2012 (16 pages).

(Continued)

*Primary Examiner* — Shin-Hon (Eric) Chen
*Assistant Examiner* — Viral S Lakhia
(74) *Attorney, Agent, or Firm* — K&L Gates LLP

(57) ABSTRACT

A mixed checksum injection system includes a memory, at least one processor in communication with the memory, a data repository including content, and a server including a CRMS. The CRMS executes on the at least one processor to generate a plurality of checksum values for the content. The plurality of checksum values includes a first checksum value generated using a first checksum function and a second checksum value generated using a second checksum function. The CRMS receives a first request for the content for a first platform, and responsive to receiving the first request, renders first metadata. The CRMS injects the first checksum value and an identifier of the first checksum function into the first metadata. Then, the CRMS publishes the content and the associated first metadata including the injected first checksum value and the identifier of the first checksum function.

17 Claims, 5 Drawing Sheets

(56) References Cited

U.S. PATENT DOCUMENTS

| | | | | |
|---|---|---|---|---|
| 2013/0061036 | A1* | 3/2013 | Oliver | G06F 21/73 |
| | | | | 713/150 |
| 2014/0101425 | A1* | 4/2014 | Walters | G06F 9/00 |
| | | | | 713/2 |
| 2014/0129527 | A1* | 5/2014 | Barrat | G06F 17/30371 |
| | | | | 707/690 |
| 2015/0106885 | A1* | 4/2015 | Mukund | G06F 16/2365 |
| | | | | 726/4 |
| 2016/0012226 | A1* | 1/2016 | Smith | G06F 21/564 |
| | | | | 713/188 |
| 2016/0044034 | A1* | 2/2016 | Spilman | G06F 21/602 |
| | | | | 713/181 |
| 2016/0050701 | A1* | 2/2016 | Pyattaev | H04W 76/14 |
| | | | | 370/329 |
| 2016/0308885 | A1* | 10/2016 | McDougal | H04L 63/0281 |
| 2016/0342462 | A1* | 11/2016 | Karamanolis | G06F 11/1004 |
| 2017/0060936 | A1* | 3/2017 | Gammans | G06F 17/30176 |
| 2017/0075938 | A1* | 3/2017 | Black | G06F 21/602 |
| 2017/0099149 | A1* | 4/2017 | Eber | H04L 67/06 |
| 2017/0208052 | A1* | 7/2017 | Jai | H04L 63/08 |
| 2018/0074964 | A1* | 3/2018 | Lai | G06F 12/0864 |
| 2018/0165080 | A1* | 6/2018 | Dimitrov | G06F 8/54 |

OTHER PUBLICATIONS

Castilho, Marcio, Calculating Multiple File Hashes in a Single Pass, marcio.io, Jul. 7, 2015 (9 pages) Link: http://marcio.io/2015/07/calculating-multiple-file-hashes-in-a-single-pass/.

* cited by examiner

MIXED CHECKSUM INJECTION FOR CONTENT VERIFICATION ON MULTIPLE PLATFORMS

BACKGROUND

Computer systems may run applications and processes that utilize various hardware components and have various software platforms. Updates to software and hardware, such as firmware updates or software packages may be installed on the computer system. A checksum may be used to detect errors in the firmware or software installation files during transmission or storage. For example, a checksum may be generated for an installation file using a checksum function. The checksum value may be used to verify data integrity when the installation file is stored or transmitted from a content server. Different platforms (e.g., operating systems and hardware devices) may support different checksum functions. For example, a peripheral device may support checksum values calculated using basic checksum functions while other devices such as computer systems may support checksum values calculated using more complex checksum functions.

SUMMARY

The present disclosure provides new and innovative systems and methods of mixed checksum injection for content verification on multiple platforms. In an example, a system includes a memory, at least one processor in communication with the memory, a data repository including content, and a server including a content repository management system (CRMS). The CRMS executes on the at least one processor to generate a plurality of checksum values for the content. The plurality of checksum values includes a first checksum value generated using a first checksum function and a second checksum value generated using a second checksum function. The CRMS receives a first request for the content for a first platform, and responsive to receiving the first request, renders first metadata. The CRMS injects the first checksum value and an identifier of the first checksum function into the first metadata. Then, the CRMS publishes the content and the associated first metadata including the injected first checksum value and the identifier of the first checksum function.

In an example, a method includes generating, by a CRMS, a plurality of checksum values for content stored on a data repository. The plurality of checksum values includes a first checksum value generated using a first checksum function and a second checksum value generated using a second checksum function. The CRMS receives a first request for the content for a first platform. Responsive to receiving the first request, the CRMS renders first metadata and injects the first checksum value and an identifier of the first checksum function into the first metadata. Then, the CRMS publishes the content and the associated first metadata including the injected first checksum value and the identifier of the first checksum function.

In an example, a non-machine readable medium readable medium storing code executes on a processor and causes a CRMS to generate a plurality of checksum values for content stored on a data repository. The plurality of checksum values includes a first checksum value generated using a first checksum function and a second checksum value generated using a second checksum function. The CRMS receives a first request for the content for a first platform. Responsive to receiving the first request, the CRMS renders first metadata and injects the first checksum value and an identifier of the first checksum function into the first metadata. Additionally, the CRMS publishes the content and the associated first metadata including the injected first checksum value and the identifier of the first checksum function.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
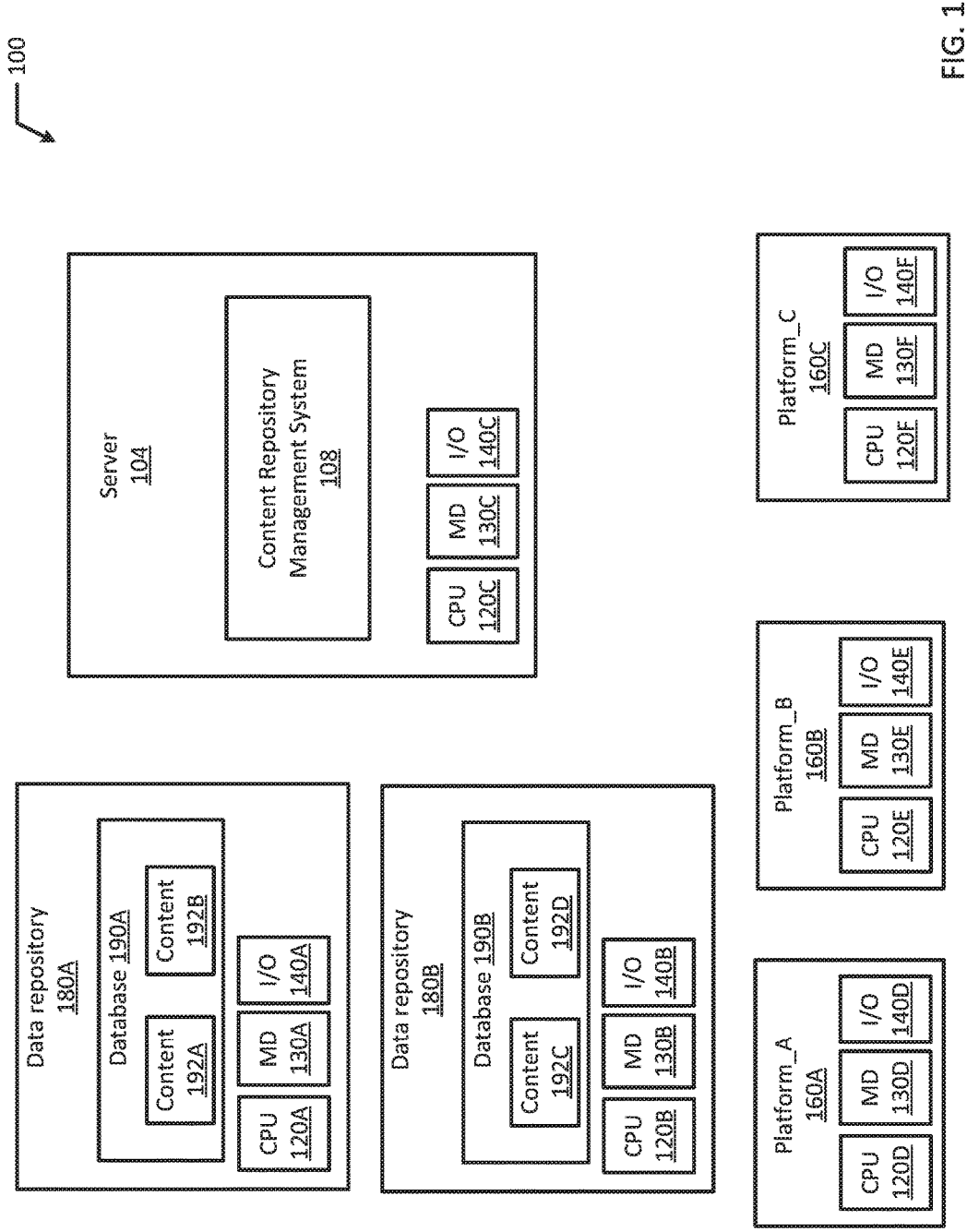
FIG. 1 illustrates a block diagram of an example server system according to an example embodiment of the present disclosure.

Techniques are disclosed for providing mixed checksum injection for content verification on multiple platforms. Current techniques of publishing content for consumption across a variety of platforms generally involve publishing any associated checksums with the content. For example, different platforms support different types of checksum functions, such as MD5, SHA-256, etc. When publishing content that may be used across a variety of platforms, the content is published with the associated checksums for each potential platform that will be utilizing the content. For example, when publishing content such as a package management system (e.g., Red Hat Package Manager or RPM Package Manager) on various versions of an operating system (OS) or different operating systems, the associated checksums for the various versions of the OS or different OSes are published with the content. For example, if the content will be distributed to platforms that use MD5, SHA-128, and SHA-256 checksum functions, then the content is typically published with checksum values generated from MD5, SHA-128, and SHA-256 functions.

However, publishing multiple checksums with each content distribution may be inefficient and/or impractical to fully support. For example, generating and publishing checksums requires processing power and system resources. Often times, many of the generated checksums may not be readily utilized by certain platforms. For example, certain platforms may not be as popular or may be outdated, and generating and publishing checksums that are associated with those platforms may result in a waste of computing resources and processing power.

As discussed in the various example embodiments disclosed herein, to improve performance and reduce overhead, a content repository management system (CRMS) may pre-generate checksum values using a variety of checksum algorithms when it is convenient (e.g., when there is adequate processing power and system resources) to generate checksum values associated with the content. Then, during rendering, the appropriate checksum function (or checksum function identifier) and the checksum value may be injected into metadata and sent with the content. For example, a platform that supports MD5 checksum functions may receive content with the appropriate MD5 generated checksum values, which advantageously improves efficiency since the platform does not have to sort through multiple unusable checksum values (e.g., checksum values calculated from unsupported checksum functions). The content and injected metadata advantageously allows the content destined for different platforms to carry the appropriate checksum values and checksum function identifiers. For example, content sent to Platform_A may include a checksum value and checksum function (e.g., SHA-1) identifier supported by Platform_A. Additionally, the CRMS may render and publish content for Platform_B with the appropriate checksum value and checksum function (e.g., SHA-256) identifier supported by Platform_B. Providing the appropriate checksum value and checksum function identifier per content publication advantageously allows the same content to be published to various different platforms. For example, by injecting the appropriate checksum value and checksum function identifier in each content package, the target platform can efficiently confirm the integrity of the content package and use the package as required.

Additionally, checksums may be generated upon request or at publication based on the request. For example, content may be published for various platforms, however, the content may include many different files. In some scenarios, only a few files may be requested per day and pre-generating checksum values for the large number of files may be wasteful of system resources. The CRMS may render and publish the content with the metadata on command thereby advantageously reducing processing time and saving system resources by generating a select few checksum values instead of generating checksum values for all the files. For example, pre-generating all of the checksums may consume a lot of resources for content that includes many different files. When files are requested infrequently, the system may save resources by calculating checksums specific to a platform upon a request for the content associated with the platform.

FIG. 1 depicts a high-level component diagram of an example server system 100 in accordance with one or more aspects of the present disclosure. The server system 100 may include a server 104 with a content repository management system 108. The server 104 may also include one or more processors (e.g., CUP 120C), memory devices (e.g., memory device 130C), and input/output devices (e.g., I/O 140C).

The server system 100 may also include one or more data repositories (e.g., data repository 180A-B). Each data repository 180A-B may include a database (e.g., database 190A-B) that stores content (e.g., Content 192A-D). In an example, a data repository (e.g., Data repository 180A-B) may include more than one database (e.g., database 190A-B). For example, data repository 180A may include a single database 190A with content 192A and content 192B. Additionally, data repository 180A may include a first database 190A with content 192A and a second database with content 192B. In another example, both the first database 190A and the second database on data repository 180A may have overlapping content (e.g., both include content 192A). Each data repository 180A-B may in turn include one or more physical processors (e.g., CPU 120A-B) communicatively coupled to respective memory devices (e.g., MD 130A-B) and respective input/output devices (e.g., I/O 140A-B).

The server system 100 may provide content to various platforms (e.g., Platform 160A-C). Each platform 160A-B may in turn include one or more physical processors (e.g., CPU 120D-F) communicatively coupled to respective memory devices (e.g., MD 130D-F) and respective input/output devices (e.g., I/O 140D-F). In an example, platform 160A (e.g., Platform_A) may be associated with a computer system using an operating system (OS), such as RHEL 5. Additionally, platform 160B may be associated with a computer system using a RHEL 6 OS that supports complex and powerful checksum functions. In another example, platform 160C (e.g., Platform_C) may be associated with a device used in a run-time environment such as a mobile device that supports more basic or low-powered checksum functions.

As used herein, physical processor or processor 120A-F refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-F refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors 120A-F may be interconnected using a variety of techniques, ranging from a point-to-point processor interconnect, to a system area network, such as an Ethernet-based network. Local connections within each node, including the connections between a processor 120A-D and a memory device 130A-D may be provided by one or more local buses of suitable architecture, for example, peripheral component interconnect (PCI).

Figure 2:
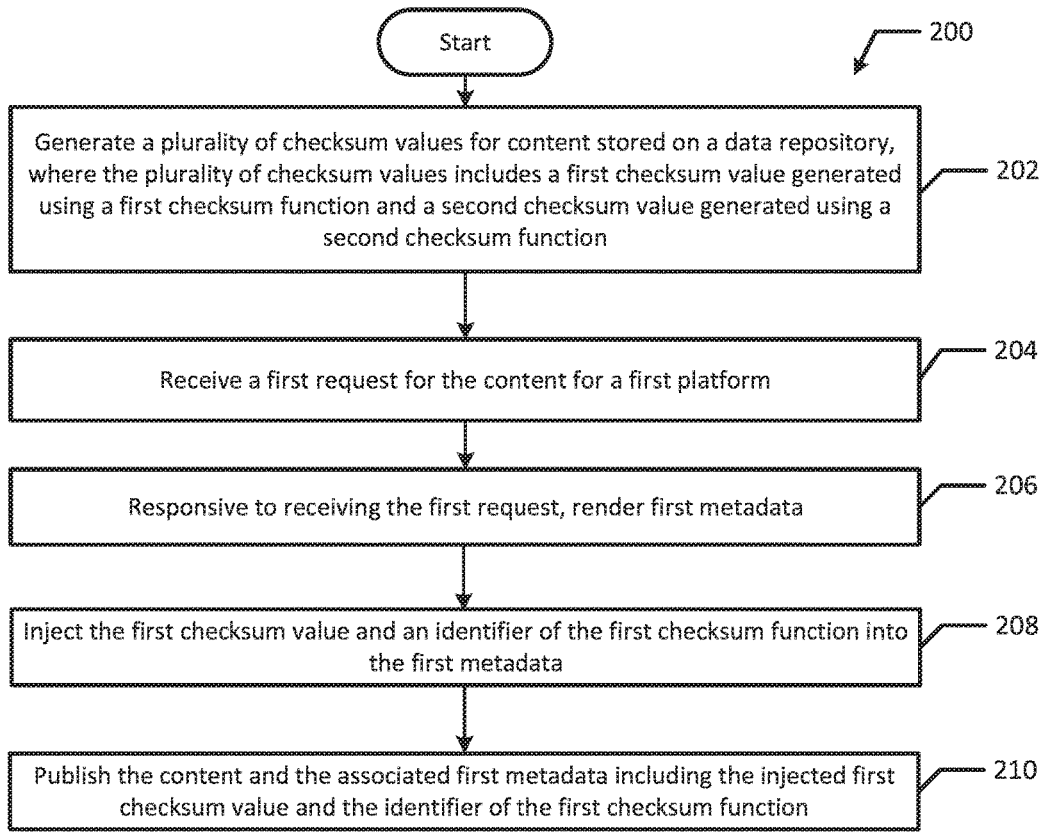
FIG. 2 illustrates a flowchart of an example process for mixed checksum injection for content verification according to an example embodiment of the present disclosure.

FIG. 2 illustrates a flowchart of an example method 200 for mixed checksum injection for content verification in accordance with an example embodiment of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, and some of the blocks described are optional. The method 200 may be performed by processing logic that may comprise hardware (circuitry, dedicated logic, etc.), software, or a combination of both.

The example method 200 includes generating a plurality of checksum values for content stored on a data repository, where the plurality of checksum values includes a first checksum value generated using a first checksum function and a second checksum value generated using a second checksum function (block 202). For example, the CRMS 108 may generate a plurality of checksum values for content (e.g., content 192A-D, hereinafter content 192) stored on data repository 180A-B, hereinafter data repository 180. For example, the first checksum value (e.g., 120EA8A425ED567F006019D487) may be generated using a SHA-256 checksum function and the second checksum value (e.g., 1387AE457F09B76) may be generated using a MD5 checksum function. In an example, the CRMS 108 may acquire content 192 immediately prior to generating the plurality of checksum values. In another example, the CRMS 108 may generate the plurality of checksum values at a scheduled time or when the appropriate amount of system resources becomes available. In an example, the first checksum function may be a cryptographic hash function. Additionally, the first checksum function may be associated with a first power consumption level and the second checksum function may be associated with a second power consumption level. For example, the first checksum function may associated with relatively complex or high-powered checksums, such as a SHA-256 checksum function, and the second checksum function may be associated with a relatively simple or low-powered checksums, such as a MD5 checksum function. In an example, the second checksum function (e.g., MD5) may be used with stripped down hardware and/or software such as a mobile device, peripheral device, or an internet of things (IoT) device.

Then, the CRMS may receive a first request for the content for a first platform (block 204). For example, the CRMS 108 may receive the request for the content 192, and the request may signify that the content 192 will be used on a first platform 160A. Additionally, an administrator or third party may request the content 192 from the CRMS 108. In an example, the first platform 160A may be a specific operating system or version of an operating system such as Red Hat Linux Enterprise 5 (RHEL 5). Responsive to receiving the first request, the CRMS may render first metadata (block 206). For example, the CRMS 108 may render first metadata including information about the file size, build type, file creator, file name, time stamp information, or the like in response to receiving the first request. In an example, the metadata may include information used by the first platform 160A.

Then, the CRMS may inject the first checksum value and an identifier of the first checksum function into the first metadata (block 208). For example, the CRMS 108 may inject the first checksum value (e.g., 120EA8A425ED567F006019D487) and an identifier of the first checksum function (e.g., SHA-256) in to the first metadata. The identifier of the first checksum function may be a name of the function or a code that specifies which checksum function was used. Additionally, the actual checksum function may be included as an identifier. In an example, the first checksum value may be generated using a low-powered checksum function, such as MD5. In another example, the first checksum value may be generated using a high-powered checksum function, such as SHA-256. The CRMS may publish the content and the associated first metadata including the injected first checksum value and the identifier of the first checksum function (block 210). For example, the CRMS 108 may publish the content 192 and the associated first metadata (e.g., file size, build type, file creator, file name, time stamp information, or the like) including the injected first checksum value (e.g., 120EA8A425ED567F006019D487) and the identifier of the first checksum function (e.g., SHA-256).

Figure 3A:
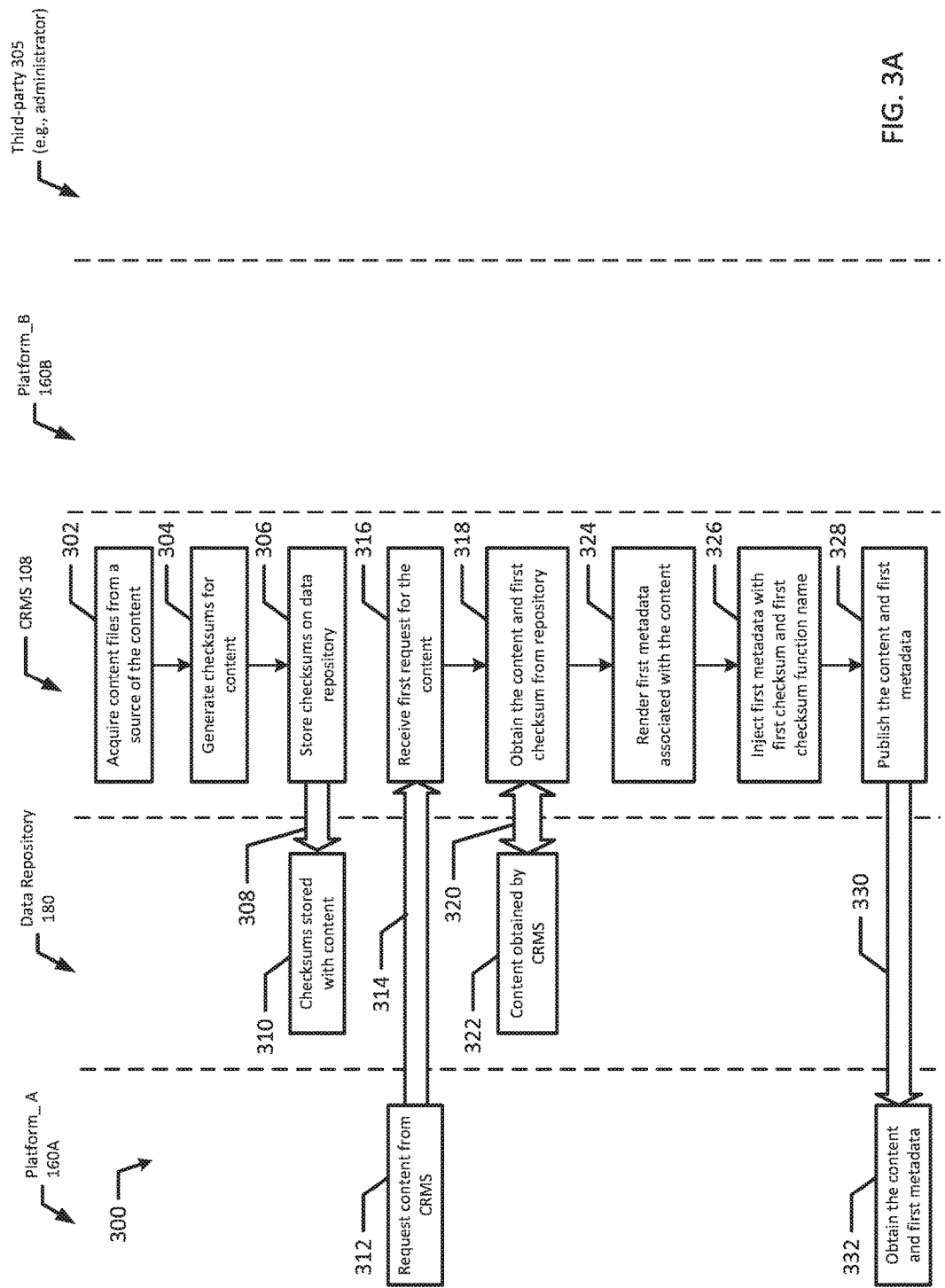
FIGS. 3A and 3B illustrate a flow diagram of an example process for mixed checksum injection for content verification according to an example embodiment of the present disclosure.
Figure 3B:
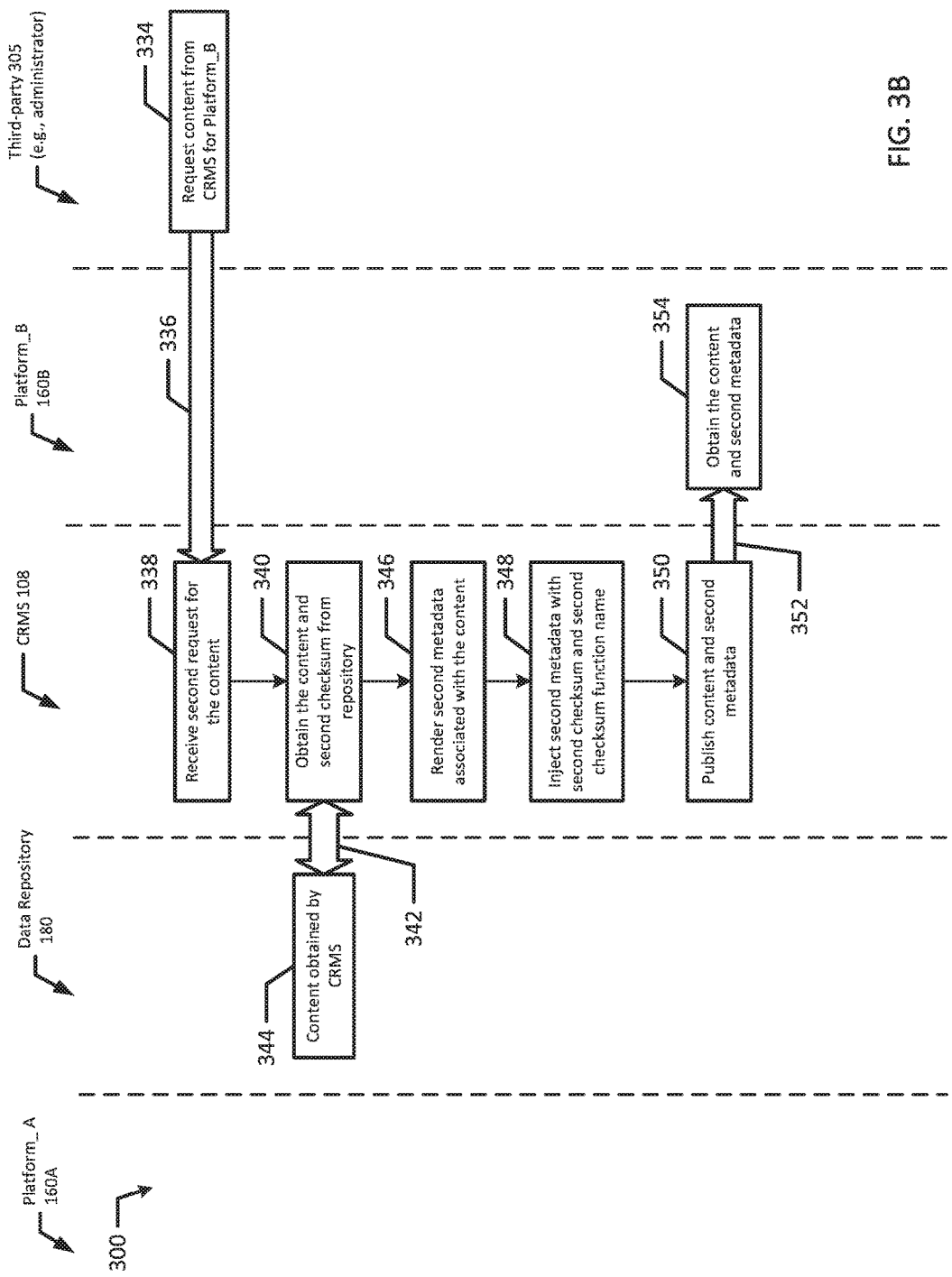

FIGS. 3A and 3B illustrate a flowchart of an example method 300 for mixed checksum injection for content verification on multiple platforms in accordance with an example embodiment of the present disclosure. Although the example method 300 is described with reference to the flowchart illustrated in FIGS. 3A and 3B, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. For example, a CRMS 108, a data repository 180, one or more platforms (e.g., Platforms 160A-B), and a third-party 305 may communicate to perform example method 300.

In the illustrated example, the CRMS 108 may acquire content 192A files from a source of the content 192A (block 302). For example, the CRMS 108 may acquire content 192A from a content delivery network. In an example, the content 192A may be a software artifact. Additionally, the content 192A may be a software package build from source code. Then, the CRMS 108 may generate checksum values for the content 192A (block 304). In an example, the checksum values may be pre-generated using various checksum functions. For example, the checksum function may include a Secure Hash Algorithm 1 ("SHA-1") to calculate SHA-1 checksums. In another example, the checksum function may include a Secure Hash Algorithm 256 (SHA-256), a Secure Hash Algorithm 384 (SHA-384), a Secure Hash Algorithm 512 (SHA-512), a MD2 algorithm, a MD4 algorithm, a MD5 algorithm, PANAMA, TIGER, ADLER32, and CR32 functions the like. The CRMS 108 may store the checksum values on data repository 180 (blocks 308 and 310). For example, the CRMS 108 may store SHA-1, SHA-256, and MD5 checksum values for the content 192A on the data repository 180. Then, data repository 180 may include checksum values stored with content 192A (block 310). For example, the data repository 180 may include a software package stored with multiple checksum values associated with different checksum functions. Each checksum function may be associated with a specific platform (e.g., platform 160A-C) that the software package can be installed on. For example, the data repository 180 may include a Red Hat Package Manager (RPM) for use with RHEL 5 and RHEL6 and the appropriate checksum values generated using various checksum functions (e.g., SHA-1 for RHEL 5 and SHA-256 for RHEL 6).

A platform, such as platform 160A (e.g., Platform_A), may request content 192A from the CRMS 108 (blocks 312 and 314). For example, Platform_A, which supports SHA-1 checksums, may request a software package from the CRMS 108. Then, the CRMS 108 may receive the request for the content 192A (block 316). The request may be included in a message or may be an instruction sent to the CRMS 108. Additionally, the request may be generated by a user by checking for a system update or specifically requesting a software patch. In an example, the request may be generated from a tool that orchestrates workflow. The CRMS 108 may obtain the content 192A and first checksum from the data repository 180 (blocks 318 and 320). For example, the CRMS 108 may obtain the software package and checksum value associated with the SHA-1 checksum function from the data repository 180. Then, the content 192A within data repository 180 may be obtained by the CRMS 180 (block 322). For example, the CRMS 108 may request the data repository 180 to send the content 192A and checksum values to the CRMS 108. In another example, the CRMS 108 may retrieve the content 192A and the appropriate checksum values from the data repository. Additionally, the CRMS 108 may verify the content 192A by confirming the obtained checksum value matches a newly calculated checksum value for the content 192A.

The CRMS 108 may render first metadata associated with the content 192A (block 324). In an example, the metadata may include information about the content 192A such as file size, file name, original creator information, timestamp information (e.g., date created, date modified), location of the content, etc. In an example, the CRMS 108 may render or write metadata into various file formats, which may be assembled and made available for publishing. Additionally, the CRMS 108 may inject the first metadata with the first checksum value and a first checksum function name (block 326). For example, the metadata may be injected with the checksum value produced by the SHA-1 checksum function and an identifier such as the checksum function name (e.g., checksumfunction_SHA-1). Then, the CRMS 108 may publish the content 192A and the first metadata (blocks 328 and 330). For example, the CRMS 108 may publish the software package with the metadata including the checksum value calculated using the SHA-1 checksum function as well as an identifier to inform Platform_A which checksum function was used. Then, platform 160A may obtain the content and first metadata (block 332). For example, platform 160A may use the identifier to calculate a checksum value using the identified checksum function (e.g., SHA-1). For example, the platform 160A may use the newly calculated checksum value to verify that it has received the appropriate file.

Additionally, a third party 305, such as an administrator may request content for a second platform 160B (e.g., Platform_B) (blocks 334 and 336). For example, an administrator may want to make content available on Platform_B and may send a request to the CRMS 108. Then, the CRMS 108 may receive the second request for content 192A (block 338). For example, the CRMS 108 may receive a request such as a message or an instruction to render and publish the content 192A. The CRMS 108 may obtain the content 192A and second checksum value from the data repository 180 (block 340).

Then, the CRMS 108 may render second metadata associated with the content 192A (block 346). For example, the CRMS 108 may render metadata that includes file information that may be used by Platform_B. Additionally, the CRMS 108 may inject the second metadata with a second checksum value and a second checksum function name (block 348). For example, the CRMS 108 may inject the second metadata with the checksum value calculated using the SHA-256 checksum function and the checksum function name (e.g., checksumfunction_SHA-256). In an example, the metadata may be injected with a single checksum value and a single checksum function identifier. Additionally, the metadata may be injected with multiple checksum values and/or checksum function identifiers. Then, the CRMS 108 may publish the content 192 and second metadata for the second platform 160B (Platform_B) (block 350 and 352). For example, the CRMS 108 may publish the content 192A according to a publication schedule (e.g., monthly software updates). Then, the second platform 160B may obtain the content 192A and second metadata (block 354). In an example, the second platform 160B may be a different operating system that the first platform 160A. Additionally, the second platform 160B may be a different version of the same operating system of the first platform 160A. In another example, the second platform 160B may be a different device, such as an IoT device or a peripheral device.

Figure 4:
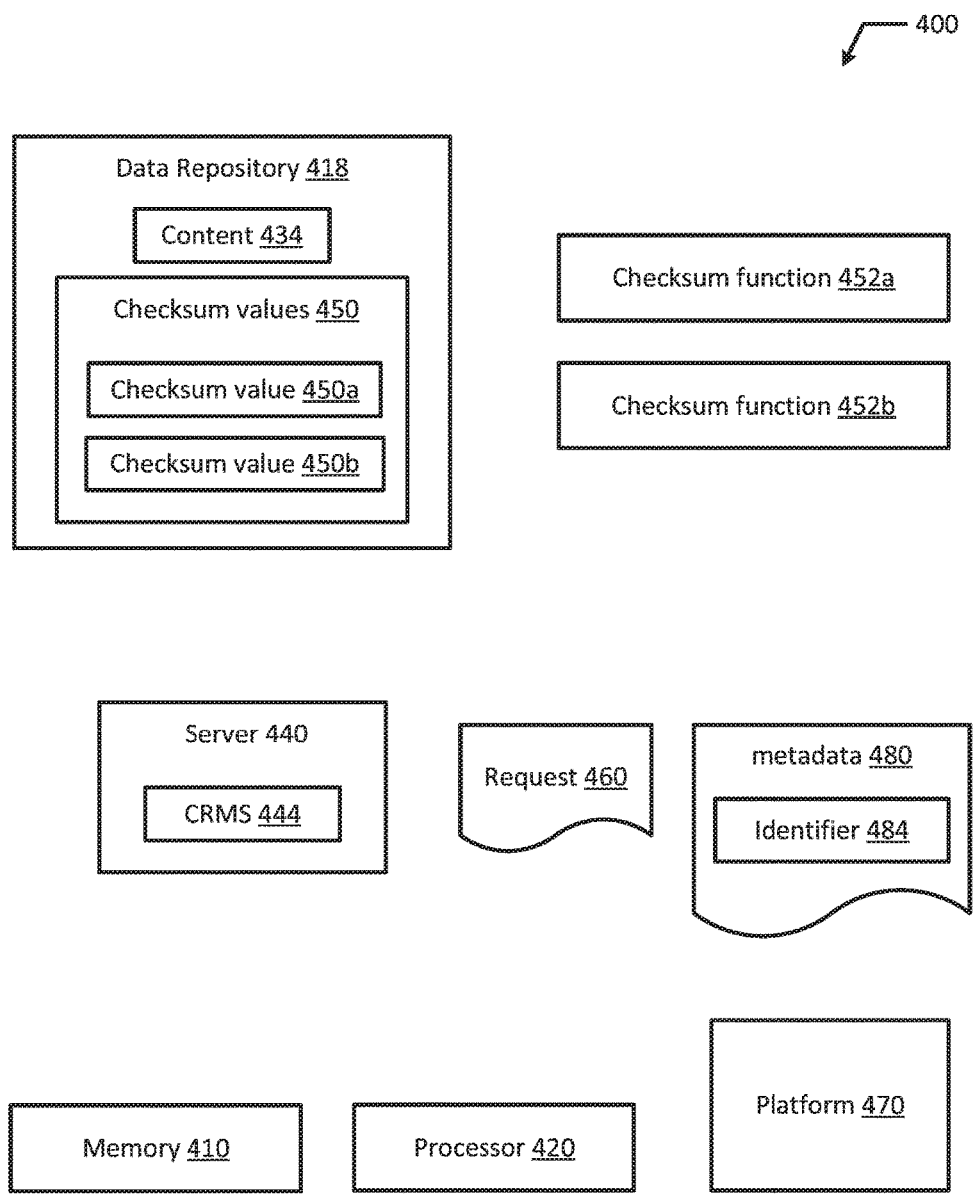
FIG. 4 illustrates a block diagram of an example mixed checksum injection system according to an example embodiment of the present disclosure.

FIG. 4 is a block diagram of an example mixed checksum injection system 400 according to an example embodiment of the present disclosure. The mixed checksum injection system 400 may include a memory 410, a processor 420 in communication with the memory 410, a data repository 418 including content 434, and a server 440 including a CRMS 444, which may execute on the processor 420 to generate a plurality of checksum values 450 for the content 434. The plurality of checksum values 450 may include a first checksum value 450a generated using a first checksum function 452a and a second checksum value 450b generated using a second checksum function 452b. The CRMS 444 may receive a first request 460 for the content 434 for a first platform 470, and responsive to receiving the first request 460 the CRMS 444 may render first metadata 480. The CRMS 444 may inject the first checksum value 450a and an identifier 484 of the first checksum function 452a into the first metadata 480. Then, the CRMS 444 may publish the content 434 and the associated first metadata 480 including the injected first checksum value 450a and the identifier 484 of the first checksum function 452a.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory;
at least one processor in communication with the memory;
a data repository including content; and
a server including a content repository management system (CRMS), wherein the CRMS executes on the at least one processor to:
generate a plurality of checksum values for the content, wherein the plurality of checksum values includes a first checksum value generated using a first checksum function and a second checksum value generated using a second checksum function, and the first checksum function is associated with a first power consumption level and the second checksum function is associated with a second power consumption level greater than the first power consumption level, receive a first request for the content for a first platform, responsive to receiving the first request, render first metadata,
inject the first checksum value and an identifier of the first checksum function into the first metadata, and
publish the content and the associated first metadata including the injected first checksum value and the identifier of the first checksum function.

2. The system of claim 1, wherein the CRMS executes on the at least one processor to:
receive a second request for the content for a second platform,
responsive to receiving the second request, render second metadata,
inject the second checksum value and an identifier of the second checksum function into the second metadata, and
publish the content and the associated second metadata including the injected second checksum value and the identifier of the second checksum function, wherein the second checksum function is unsupported on the first platform.

3. The system of claim 2, wherein the second platform uses a different operating system than the first platform.

4. The system of claim 1, wherein at least one of the first checksum function and the second checksum function is a cryptographic hash function.

5. A method comprising:
generating, by a content repository management system (CRMS), a plurality of checksum values for content stored on a data repository, wherein the plurality of checksum values includes a first checksum value generated using a first checksum function and a second checksum value generated using a second checksum function, and the first checksum function is associated with a first power consumption level and the second checksum function is associated with a second power consumption level greater than the first power consumption level;
receiving, by the CRMS, a first request for the content for a first platform;
responsive to receiving the first request, rendering first metadata;
injecting, by the CRMS, the first checksum value and an identifier of the first checksum function into the first metadata; and
publishing, by the CRMS, the content and the associated first metadata including the injected first checksum value and the identifier of the first checksum function.

6. The method of claim 5, further comprising:
receiving, by the CRMS, a second request for the content for a second platform;
responsive to receiving the second request, rendering second metadata;
injecting, by the CRMS, the second checksum value and an identifier of the second checksum function into the second metadata; and
publishing, by the CRMS, the content and the associated second metadata including the injected second checksum value and the identifier of the second checksum function, wherein the second checksum function is unsupported on the first platform.

7. The method of claim 6, wherein the second platform is a newer version of the first platform.

8. The method of claim 5, further comprising acquiring the content immediately prior to generating the plurality of checksum values.

9. The method of claim 5, wherein at least one of the first checksum function and the second checksum function is a cryptographic hash function.

10. The method of claim 5, wherein the first checksum function includes at least one of a Secure Hash Algorithm 1 (SHA-1), a Secure Hash Algorithm 256 (SHA-256), a Secure Hash Algorithm 512 (SHA-512), and a MD5 algorithm.

11. The method of claim 5, further comprising comparing the first checksum value against a previously stored third checksum value.

12. A non-transitory machine readable medium storing code, which when executed by a processor causes a content repository management system (CRMS) to:
generate a plurality of checksum values for content stored on a data repository, wherein the plurality of checksum values includes a first checksum value generated using a first checksum function and a second checksum value generated using a second checksum function, and the first checksum function is associated with a first power consumption level and the second checksum function is associated with a second power consumption level greater than the first power consumption level;
receive a first request for the content for a first platform;
responsive to receiving the first request, render first metadata;
inject the first checksum value and an identifier of the first checksum function into the first metadata; and
publish the content and the associated first metadata including the injected first checksum value and the identifier of the first checksum function.

13. The non-transitory machine readable medium of claim 12, which further causes the CRMS to:
receive a second request for the content for a second platform;
responsive to receiving the second request, rendering second metadata;
inject the second checksum value and an identifier of the second checksum function into the second metadata; and
publish the content and the associated second metadata including the injected second checksum value and the identifier of the second checksum function, wherein the second checksum function is unsupported on the first platform.

14. The non-transitory machine readable medium of claim 13, wherein at least one of the first checksum function and the second checksum function is a cryptographic hash function.

15. The non-transitory machine readable medium of claim 12 further comprising acquiring the content immediately prior to generating the plurality of checksum values.

16. The non-transitory machine readable medium of claim 12, wherein the first checksum function includes at least one of a Secure Hash Algorithm 1 (SHA-1), a Secure Hash Algorithm 256 (SHA-256), a Secure Hash Algorithm 512 (SHA-512), and a MD5 algorithm.

17. The non-transitory machine readable medium of claim 12, further comprising comparing the first checksum value against a previously stored checksum value.

* * * * *